(12) United States Patent
Hung et al.

(10) Patent No.: US 7,667,412 B2
(45) Date of Patent: Feb. 23, 2010

(54) LIGHT SOURCE DRIVING DEVICE

(75) Inventors: Tsung-Liang Hung, Taipei Hsien (TW);
Chi-Hsiung Lee, Taipei Hsien (TW)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/617,758

(22) Filed: Dec. 29, 2006

(65) Prior Publication Data

US 2008/0030151 A1 Feb. 7, 2008

(30) Foreign Application Priority Data

Aug. 4, 2006 (CN) .......................... 2006 2 0017366

(51) Int. Cl.
*G05F 1/00* (2006.01)
(52) U.S. Cl. ........................ 315/291; 315/307; 315/207; 315/224; 315/274
(58) Field of Classification Search ............. 315/200 R, 315/201, 205, 209 R, 210, 211, 212, 224, 315/225, 226, 246, 250, 254, 276, 291, 307, 315/312, DIG. 7
See application file for complete search history.

(56) References Cited

U.S. PATENT DOCUMENTS

| | | | | |
|---|---|---|---|---|
| 6,495,972 | B1 * | 12/2002 | Okamoto et al. | 315/291 |
| 7,164,240 | B2 * | 1/2007 | Moyer et al. | 315/255 |
| 2003/0201967 | A1 * | 10/2003 | Yu | 345/102 |
| 2004/0217719 | A1 * | 11/2004 | Higuchi | 315/312 |
| 2006/0091820 | A1 * | 5/2006 | Jang | 315/209 R |

* cited by examiner

*Primary Examiner*—Tuyet Vo
(74) *Attorney, Agent, or Firm*—Wei Te Chung

(57) ABSTRACT

A driving device for driving a light source module (12), includes an inverter circuit (15) for converting a received signal to a signal driving the light source module, a feedback and filter circuit (13) for feeding back currents flowing through the light sources and filtering radio frequency interference (RFI) signals of feedback currents, and a controller (14) electrically connected between the feedback and filter circuit and the inverter circuit. The feedback and filter circuit includes at least one filter for filtering the RFI signals of the feedback currents, and a resistor (R) for feeding back the current flowing through the light source module. The filter includes an impedance ($Z_{11}$) including a first terminal designated as an input of the filter and a second terminal, and a capacitor ($C_{11}$). The capacitor includes a third terminal designated as an output of the filter and a fourth terminal electrically connected to ground.

9 Claims, 10 Drawing Sheets

LIGHT SOURCE DRIVING DEVICE

BACKGROUND OF THE INVENTION

1. Field of the Invention

The invention relates to light source driving devices, and particularly to a light source driving device used in a liquid crystal display (LCD) backlight module.

2. Description of Related Art

Conventionally, discharge lamps, especially cold cathode fluorescent lamps (CCFL), have been used as backlight sources in liquid crystal display (LCD) panels, and often are driven by an inverter circuit supplying alternating current signals to the discharge lamps. According to current from a feedback circuit flowing through the discharge lamps, a controller controls output of the inverter circuit. However, the current flowing through the discharge lamps is prone to be interfered with by outer radio frequency (RF) signals, such as, from 824 megahertz to 1909.8 megahertz signals from global system for mobile communication (GSM), resulting in flashes of the discharge lamps.

Therefore, a heretofore unaddressed need exists in the industry to overcome the aforementioned deficiencies and inadequacies.

SUMMARY OF THE INVENTION

An exemplary embodiment of the invention provides a driving device for driving a light source module including a plurality of light sources. The driving device includes an inverter circuit for converting a received signal to a signal driving the light sources, a feedback and filter circuit for feeding back current flowing through the light sources and filtering radio frequency interference (RFI) signals of the feedback current, and a controller electrically connected between the feedback and filter circuit and the inverter circuit. The feedback and filter circuit includes at lest one filter for filtering the RFI signals of the feedback current, and a resistor for feeding back the current flowing through the light sources. The at least one filter includes an impedance including a first terminal designated as an input of the filter and a second terminal, and a capacitor. The capacitor includes a third terminal designated as an output of the filter and a fourth terminal electrically connected to ground.

Other advantages and novel features will become more apparent from the following detailed description of preferred embodiments when taken in conjunction with the accompanying drawings, in which:

DETAILED DESCRIPTION OF THE INVENTION

Figure 1A:
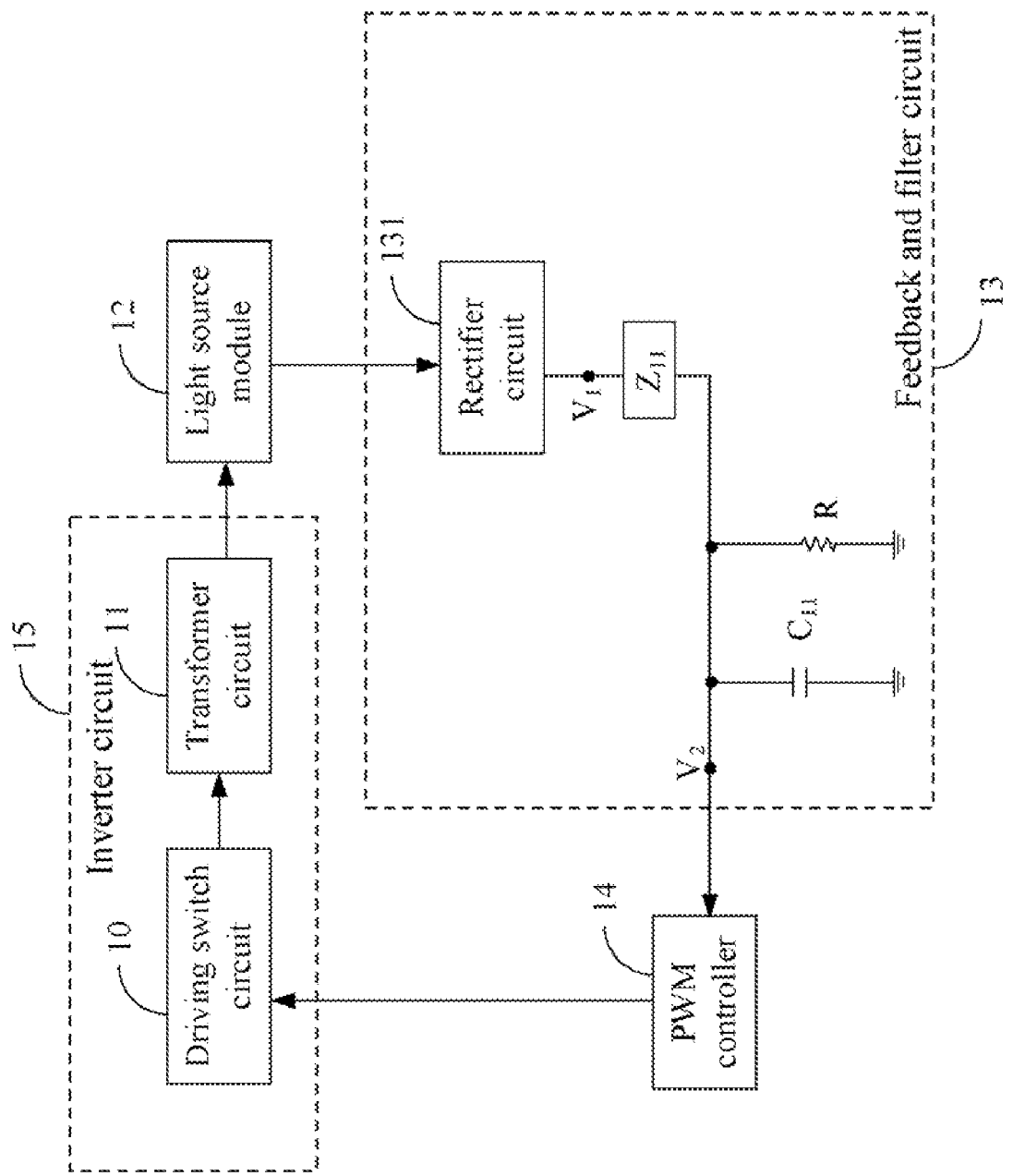
FIG. 1a is a block diagram of a light source driving device of a first exemplary embodiment of the present invention.

FIG. 1 is a block diagram of a light source driving device of a first exemplary embodiment of the present invention. The light source driving device for driving a light source module 12, includes an inverter circuit 15, a feedback and filter circuit 13, and a pulse width modulation (PWM) controller 14.

The feedback and filter circuit 13 includes a rectifier circuit 131, a resistor R, and at least one filter for filtering radio frequency interference (RFI) signal of a feedback current. The filter includes an impedance $Z_{11}$ and a capacitor $C_{11}$. The impedance $Z_{11}$ includes a first terminal designated as an input of the filter and a second terminal. The capacitor $C_{11}$ includes a third terminal designated as an output of the filter, and a fourth terminal electrically connected to ground. In the embodiment, the feedback current is a current flowing through the feedback and filter circuit 13.

In the embodiment, the light source module 12 includes a plurality of light sources. The inverter circuit 15 includes a driving switch circuit 10 and a transformer circuit 11 electrically connected to the driving switch circuit 10.

The inverter circuit 15 receives a signal and converts the received signal to a signal for driving the light source module 12, herein the signal for driving the light source module 12 is designated as a driving signal. The driving switch circuit 10 converts the received signal to an alternating current (AC) signal, and transmits the AC signal to the transformer circuit 11. The transformer circuit 11 converts the AC signal to the driving signal. In the embodiment, the AC signal is a rectangular wave signal. The driving signal is a sine wave signal.

The feedback and filter circuit 13 is electrically connected between the light source module 12 and the PWM controller 14. The feedback and filter circuit 13 is configured for feeding back the current flowing through the light source module 12, and filtering the RFI signal of the feedback current.

The PWM controller 14 is electrically connected between the inverter circuit 15 and the feedback and filter circuit 13. The PWM controller 14 is configured for controlling output of the inverter circuit 15 in light of the feedback current signals.

The feedback and filter circuit 13 is electrically connected between a low voltage terminal of the light source module 12 and the PWM controller 14. The first terminal of the impedance $Z_{11}$ is electrically connected to the low voltage terminal of the light source module 12, and the second terminal of the impedance $Z_{11}$ is electrically connected to the PWM controller 14. The capacitor $C_{11}$ is electrically connected between the second terminal of the impedance $Z_{11}$ and ground. That is, the third terminal of the capacitor $C_{11}$ is electrically connected to the second terminal of the impedance $Z_{11}$. The resistor R is electrically connected between the second terminal of the impedance $Z_{11}$ and ground, for feeding back the current flowing through the light source module 1 2. The rectifier circuit 131 is electrically connected between the low voltage terminal of the light source module 12 and the first terminal of the impedance $Z_{11}$, for converting the AC signal flowing through the light source module 12 to a ripple signal.

In the embodiment, the rectifier circuit 131 can be a full wave rectifier circuit or a half wave rectifier circuit.

In the embodiment, the impedance $Z_{11}$ can be a resistor, an inductance, or a parallel circuit comprising a resistor and a capacitor. That is, the filter can be a low-pass filter, or a high-pass filter.

If the impedance $Z_{11}$ is a resistor, and a value of the equivalent resistance of the impedance $Z_{11}$ is defined as $R_1$. A value of equivalent resistance of the resistor R is defined as $R_2$. A value of the equivalent capacitance of the capacitor $C_{11}$ is defined as C. In the embodiment, an input voltage of the feedback and filter circuit 13 is defined as $V_1$. An output voltage of the feedback and filter circuit 1 3 is defined as $V_2$. Thus, the value of the output voltage corresponding to the input voltage in the feedback and filter circuit 13 is represented by the following equation:

$$\frac{V_2}{V_1} = \frac{\frac{\frac{1}{j\omega C} * R_2}{\frac{1}{j\omega C} + R_2}}{R_1 + \frac{\frac{1}{j\omega C} * R_2}{\frac{1}{j\omega C} + R_2}} = \frac{R_2}{R_1 + R_2} * \frac{1}{1 + j\omega C \frac{R_1 R_2}{R_1 + R_2}}$$

wherein, $\omega = 2\pi f$.

When $$\frac{V_2}{V_1} = \frac{1}{\sqrt{2}},$$

a gain value of feedback and filter circuit 13 is equal to −3 db which is calculated by the following equation:

$$20 lg \left| \frac{V_2}{V_1} \right| = -3 \text{ dB},$$

and a corresponding high pass cutoff frequency designated as $f_h$ of the feedback and filter circuit 13 is represented by the following equation:

$$f_h == \frac{1}{2\pi C \left( \frac{R_1 * R_2}{R_1 + R_2} \right)}.$$

Therefore, if a value of a frequency is greater than that of $f_h$, the frequency cannot pass through the feedback and filter circuit 13 to output to the PWM controller 14. In this way, the feedback and filter circuit 13 can filter unnecessary RFI signals.

Figure 1B:
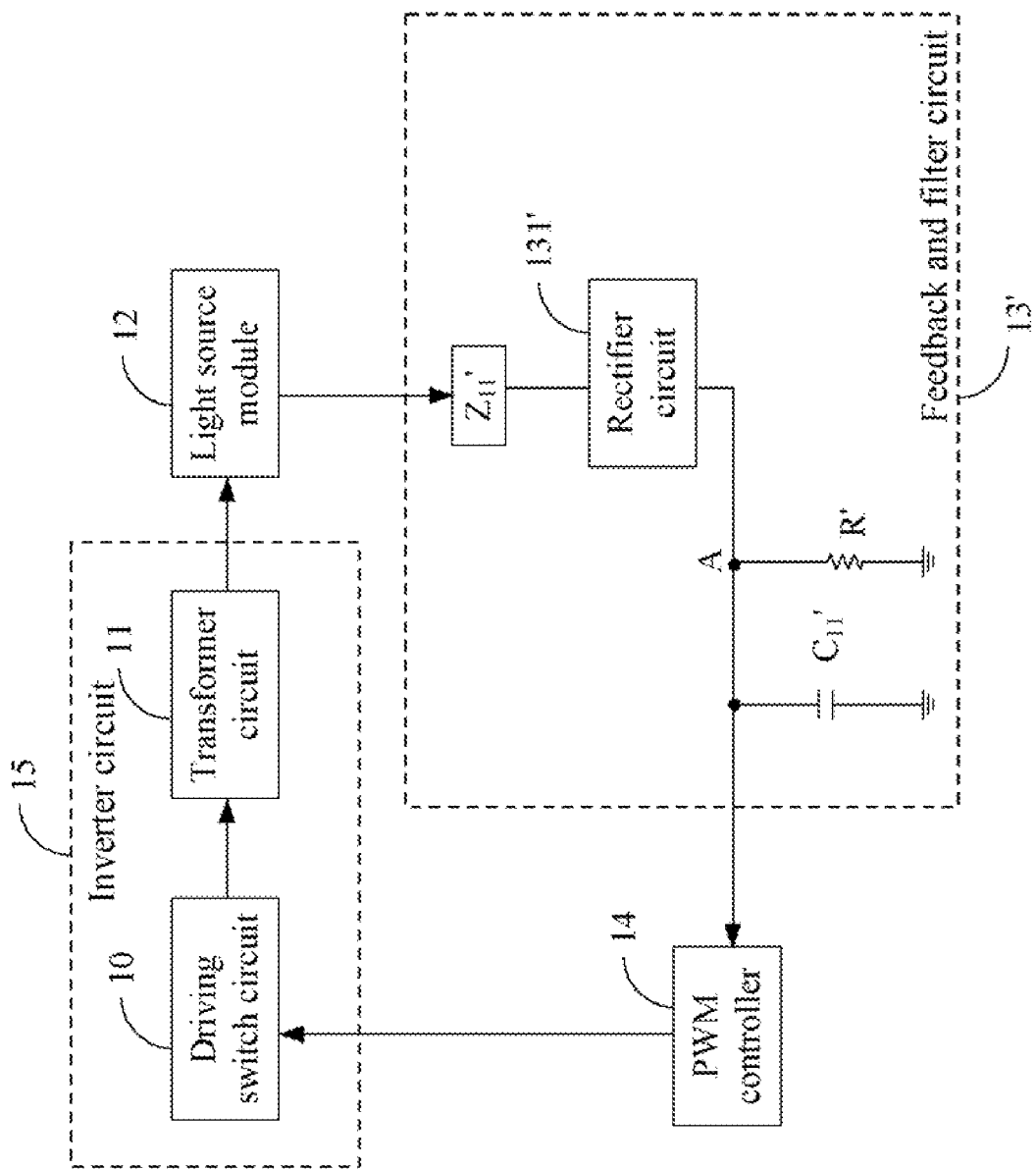
FIG. 1b is a block diagram of a light source driving device of a second exemplary embodiment of the present invention.

FIG. 1b is a block diagram of a light source driving device of a second exemplary embodiment of the present invention. The light source driving device of FIG. 1b includes an inverter circuit 15 including a driving switch circuit 10 and a transformer circuit 11, a light source module 12, a feedback and filter circuit 13', and a PWM controller 14. The feedback and filter circuit 13' includes a rectifier circuit 131', a resistor R', and a filter including an impedance $Z_{11}'$ and a capacitor $C_{11}'$. All elements, constructions, and functions of the light source driving device of FIG. 1b are the same as the light source driving device of FIG. 1a, except that a first terminal of the impedance $Z_{51}'$ is electrically connected to a low voltage terminal of the light source module 52, and a node A is formed between the capacitor $C_{11}'$ and the resistor R'. Furthermore, the rectifier circuit 131' is electrically connected between the node A and a second terminal of the impedance $Z_{11}'$.

Figure 2:
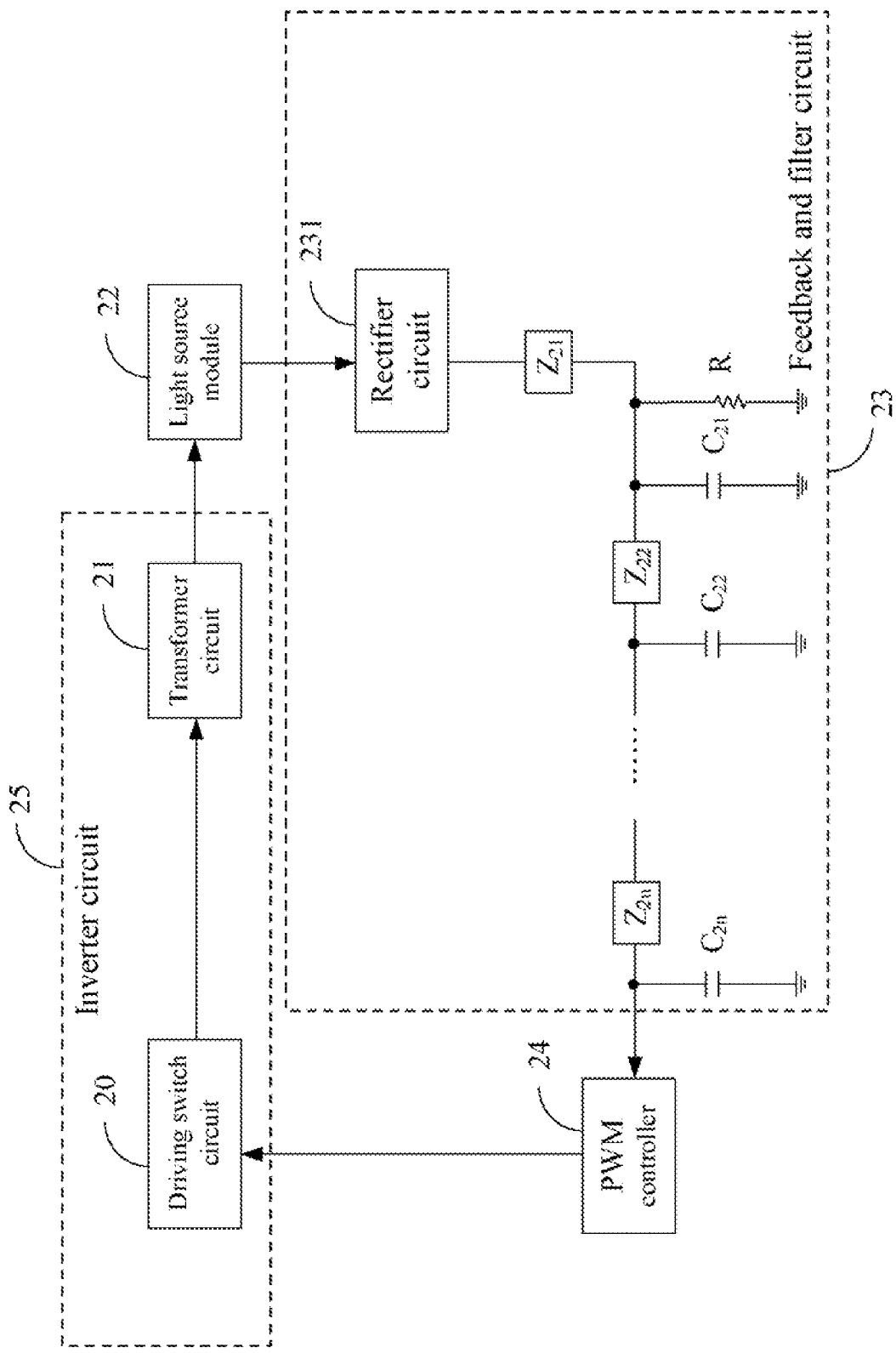
FIG. 2 is a block diagram of a light source driving device of a third exemplary embodiment of the present invention.

FIG. 2 is a block diagram of a light source driving device of a third exemplary embodiment of the present invention. The light source driving device of FIG. 2 includes an inverter circuit 25 including a driving switch circuit 20 and a transformer circuit 21, a light source module 22, a feedback and filter circuit 23, and a PWM controller 24. The inverter circuit 25, the light source module 22, and the PWM controller 24 are substantially the same as the inverter circuit 15, the light source module 12, and the PWM controller 14 of FIG. 1a. The feedback and filter circuit 23 includes a rectifier circuit 231, a resistor R, and a plurality of filters. The rectifier circuit 231 is substantially the same as the rectifier circuit 131 of FIG. 1a. In the embodiment, the number of the filters is defined as n, where n is an integer from 2 to n. An output of the $(n-1)^{th}$ filter is electrically connected to an input of the $n^{th}$ filter. Each of the filters is substantially the same as the filter of FIG. 1. In this way, a capacitor $C_{2n}$ of the $n^{th}$ filter is electrically connected in parallel to the a capacitor $C_{2(n-1)}$ of the $(n-1)^{th}$ filter via an impedance $Z_{2n}$ of the nth filter (n=2, 3, 4, . . . , n). In the embodiment, the more filters there are, the better the rectifier circuit 231 filters the unnecessary RFI signals.

In the embodiment, the impedance $Z_{2n}$ (n=1, 2, 3, . . . , n) can be a resistor, an inductance, or a parallel circuit comprising a resistor and a capacitor. That is, the filters can be low-pass filters, or high-pass filters, or a series circuit comprising low-pass filters and high-pass filters.

In an alternative embodiment, the capacitor $C_{2n}$ can be a equivalent capacitance (n=1, 2, 3, 4, . . . , n).

Figure 3:
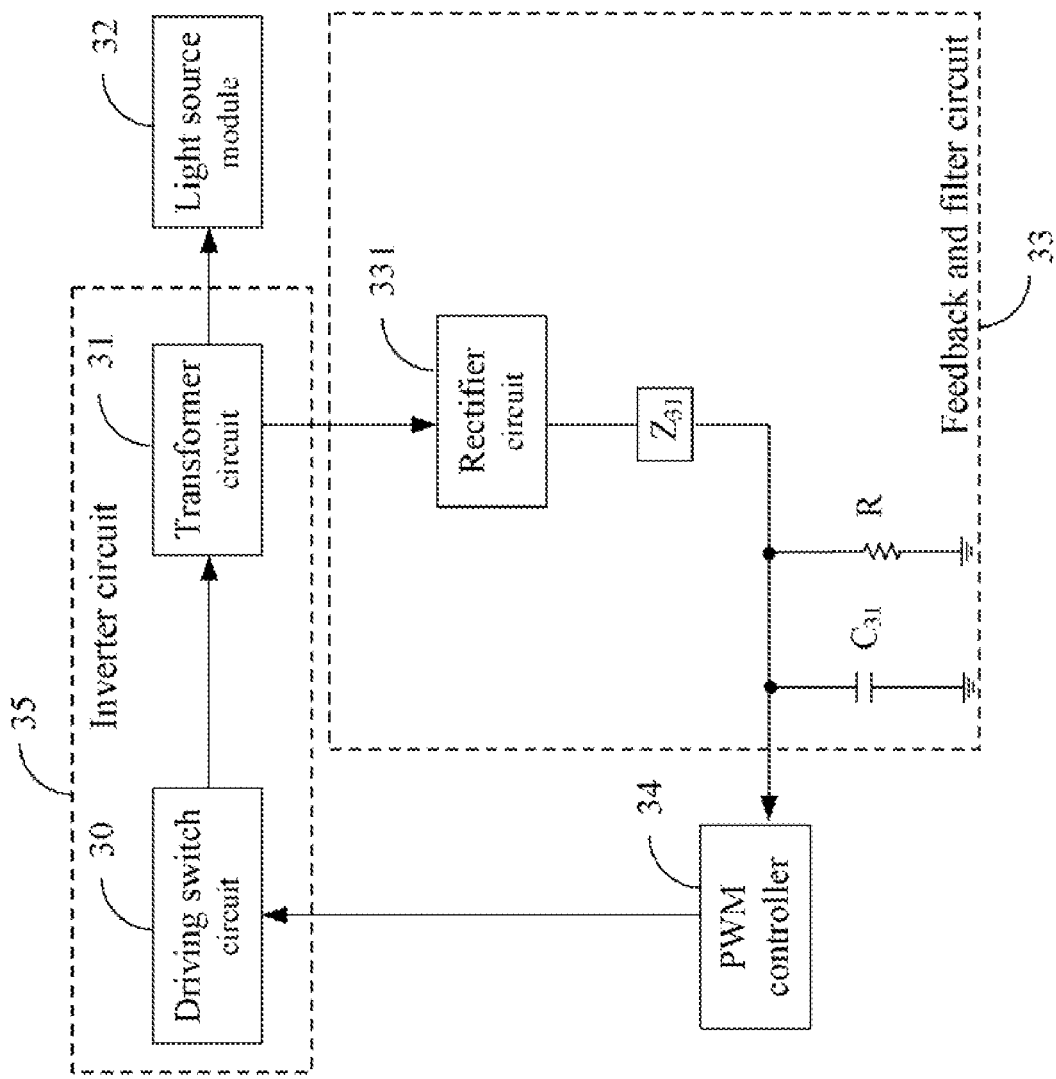
FIG. 3 is a block diagram of a light source driving device of a fourth exemplary embodiment of the present invention.

FIG. 3 is a block diagram of a light source driving device of a fourth exemplary embodiment of the present invention. The light source driving device of FIG. 3 includes an inverter circuit 35 including a driving switch circuit 30 and a transformer circuit 31, a light source module 32, a feedback and filter circuit 33, and a PWM controller 34. The feedback and filter circuit 33 includes a rectifier circuit 331, a resistor R, and a filter including an impedance $Z_{31}$ and a capacitor $C_{31}$. All elements, constructions, and functions of the light source driving device of FIG. 3 are the same as the light source driving device of FIG. 1a, except that the feedback and filter circuit 33 is electrically connected between the transformer circuit 31 and the PWM controller 34, and the rectifier circuit 331 is electrically connected between an input of the filter and a low voltage terminal of the transformer circuit 31.

Figure 4:
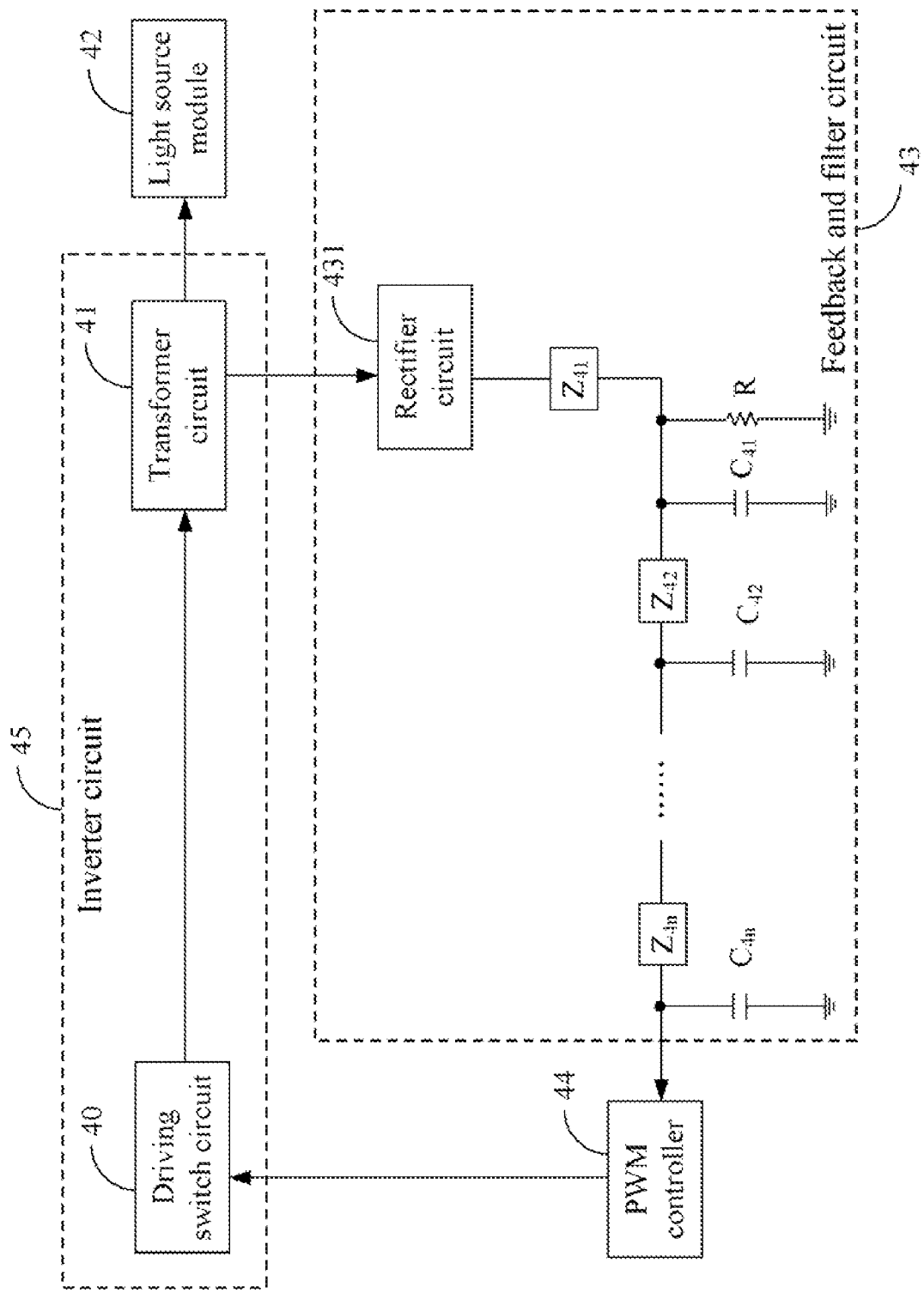
FIG. 4 is a block diagram of a light source driving device of a fifth exemplary embodiment of the present invention.

FIG. 4 is a block diagram of a light source driving device of a fifth exemplary embodiment of the present invention. The light source driving device of FIG. 4 includes an inverter circuit 45 including a driving switch circuit 40 and a transformer circuit 41, a light source module 42, a feedback and filter circuit 43, and a PWM controller 44. The feedback and filter circuit 43 includes a rectifier circuit 431, a resistor R, and a plurality of filters, herein the number of the filters is n, where n is an integer from 2 to n. Each of the filters includes an impedance $Z_{4n}$ and a capacitor $C_{4n}$ (n=1, 2, 3, 4, . . . , n). All elements, constructions, and functions of the light source driving device of FIG. 4 are the same as the light source driving device of FIG. 2, except that the feedback and filter circuit 43 is electrically connected between the transformer circuit 41 and the PWM controller 44, and the rectifier circuit 431 is electrically connected between an input of the first filter and a low voltage terminal of the transformer circuit 41.

Figure 5A:
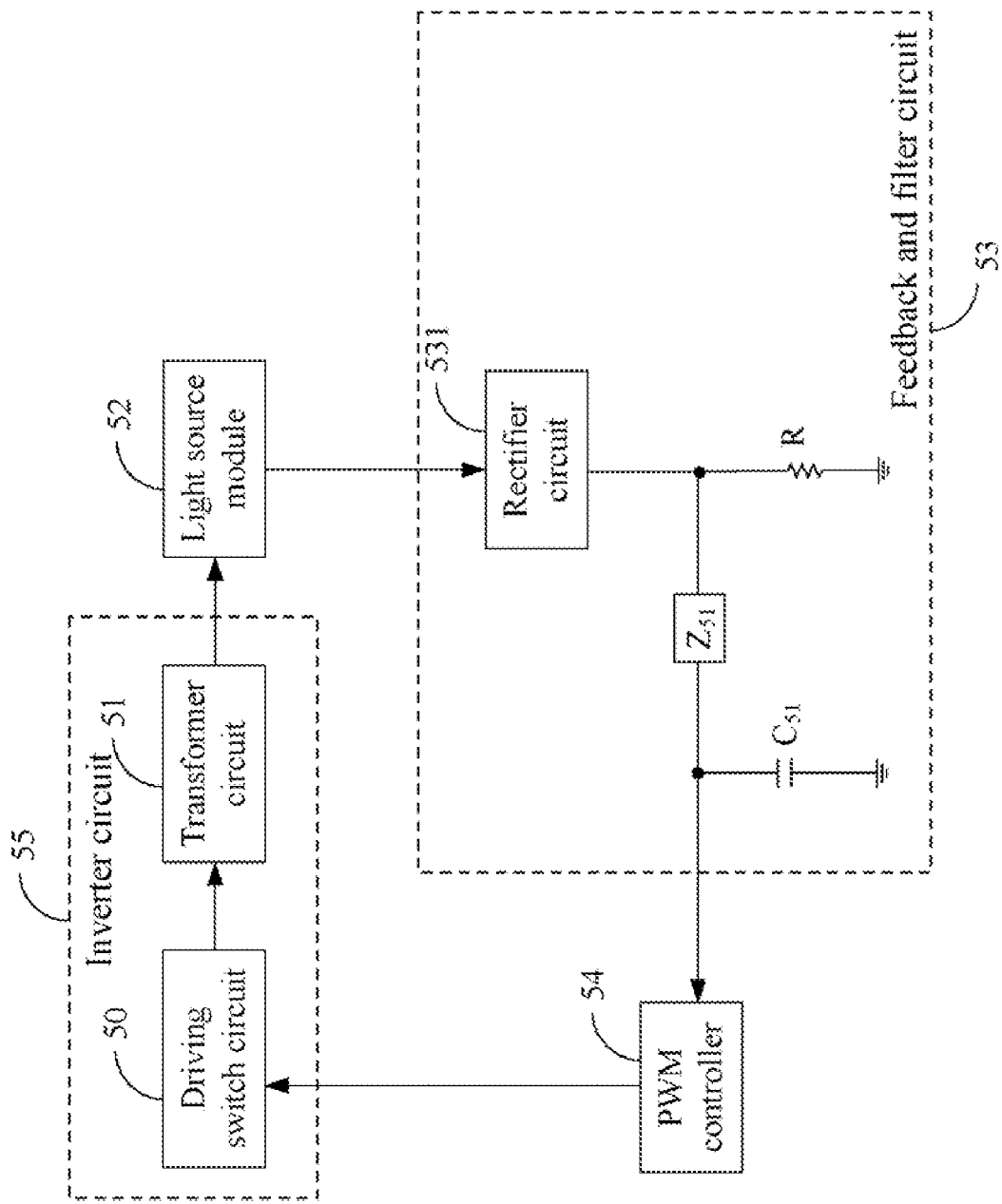
FIG. 5a is a block diagram of a light source driving device of a sixth exemplary embodiment of the present invention.

FIG. 5a is a block diagram of a light source driving device of a sixth exemplary embodiment of the present invention. The light source driving device of FIG. 5a includes an inverter circuit 55 including a driving switch circuit 50 and a transformer circuit 51, a light source module 52, a feedback and filter circuit 53, and a PWM controller 54. The feedback and filter circuit 53 includes a rectifier circuit 531, a resistor R, and a filter including an impedance $Z_{51}$ and a capacitor $C_{51}$. All elements, constructions, and functions of the light source driving device of FIG. 5a are the same as the light source driving device of FIG. 1a, except that a first terminal of the impedance $Z_{51}$ designated as an input of the filter is electrically connected to a low voltage terminal of the light source module 52 via the rectifier circuit 531, and a second terminal of the impedance $Z_{51}$ is electrically connected to the PWM controller 54. In addition, the resistor R is electrically connected between the first terminal of the impedance $Z_{51}$ and the rectifier circuit 531, and ground.

Figure 5B:
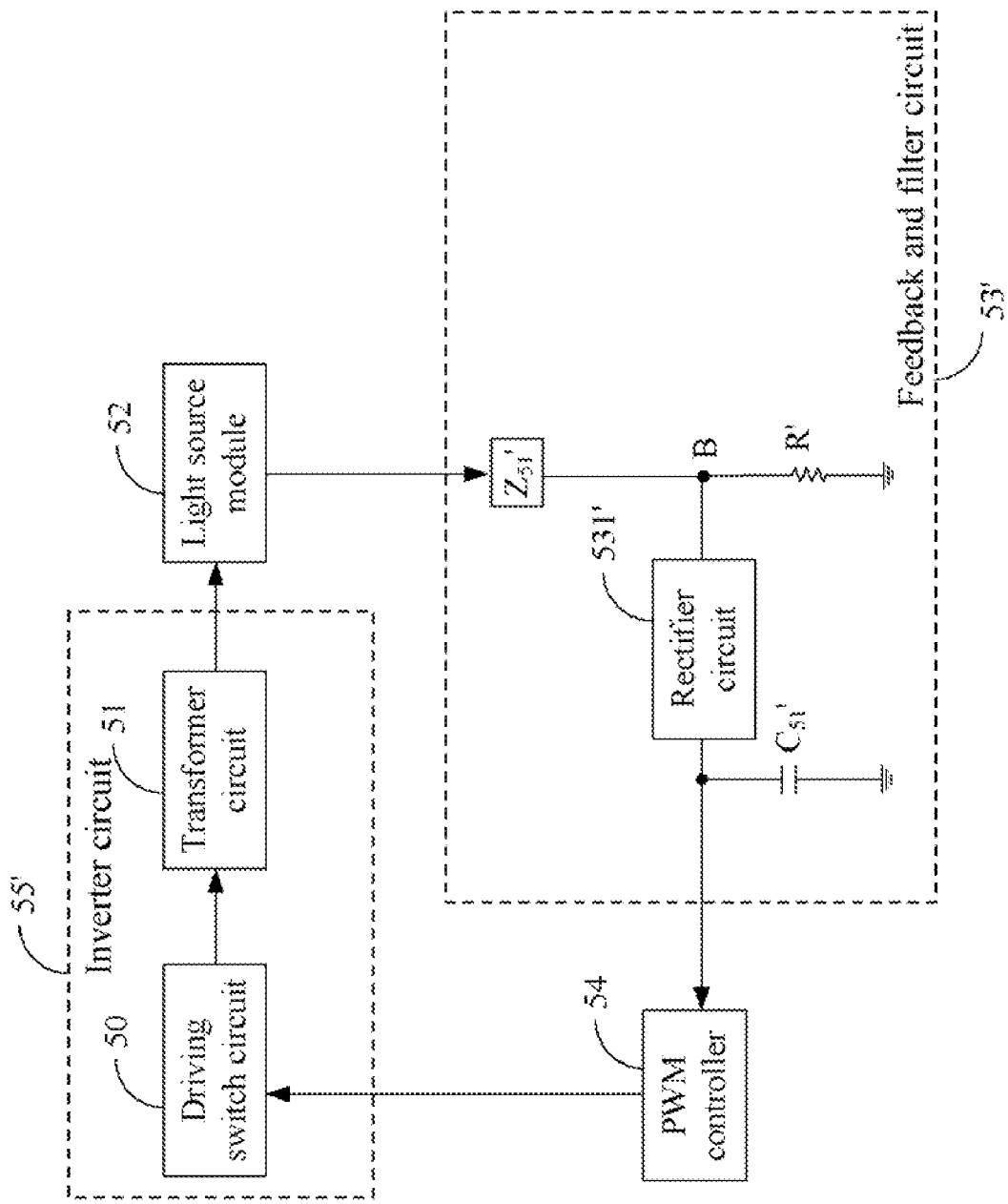
FIG. 5b is a block diagram of a light source driving device of a seventh exemplary embodiment of the present invention.

FIG. 5b is a block diagram of a light source driving device of a seventh exemplary embodiment of the present invention. The light source driving device of FIG. 5b includes an inverter circuit 55' including a driving switch circuit 50 and a transformer circuit 51, a light source module 52, a feedback and filter circuit 53', and a PWM controller 54. The feedback and filter circuit 53' includes a rectifier circuit 531', a resistor R', and a filter including an impedance $Z_{51}'$ and a capacitor $C_{51}'$. All elements, constructions, and functions of the light source driving device of FIG. 5b are the same as the light source driving device of FIG. 5a, except that a first terminal of the impedance $Z_{51}'$ is electrically connected to a low voltage terminal of the light source module 52, and a node B is formed between a second terminal of the impedance $Z_{51}'$ and the resistor R'. In addition, the rectifier circuit 531' is electrically connected between the node B and the capacitor $C_{51}'$.

Figure 6:
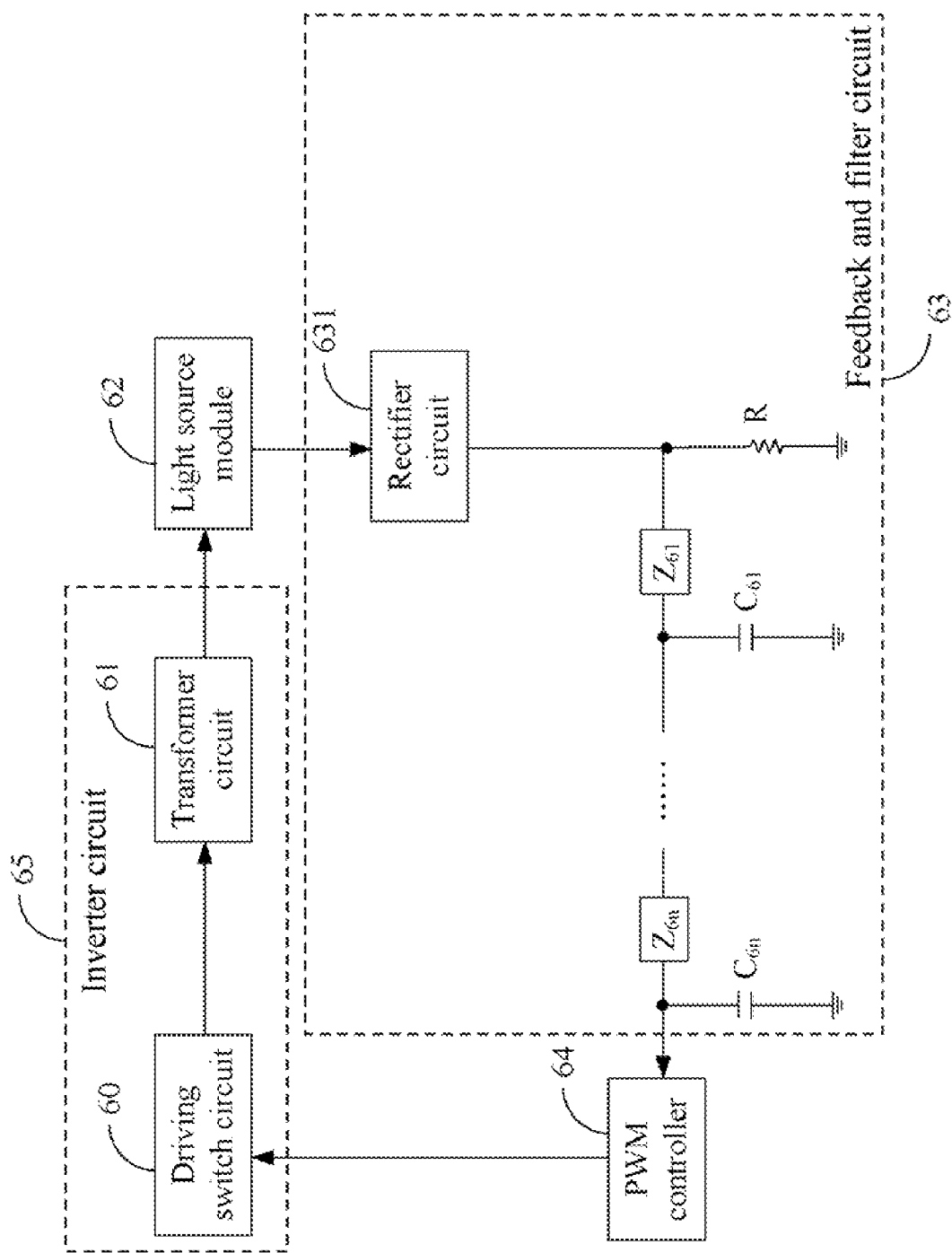
FIG. 6 is a block diagram of a light source driving device of a eighth exemplary embodiment of the present invention.

FIG. 6 is a block diagram of a light source driving device of an eighth exemplary embodiment of the present invention. The light source driving device of FIG. 6 includes an inverter circuit 65 including a driving switch circuit 60 and a transformer circuit 61, a light source module 62, a feedback and filter circuit 63, and a PWM controller 64. The inverter circuit 65, the light source module 62, and the PWM controller 64 are substantially the same as the inverter circuit 55, the light source module 52, and the PWM controller 54 of FIG. 5a. The feedback and filter circuit 63 includes a rectifier circuit 631, a resistor R, and a plurality of filters. The rectifier circuit 631 is substantially the same as the rectifier circuit 531 of FIG. 5a. In the embodiment, the number of the filters is n, where n is an integer from 2 to n. An output of the $(n-1)^{th}$ filter is electrically connected to an input of the nth filter. Each of the filters is substantially the same as the filter of FIG. 5a. In this way, a capacitor $C_{6n}$ of the $n^{th}$ filter is electrically connected in parallel to the a capacitor $C_{6(n-1)}$ of the $(n-1)^{th}$ filter via an impedance $Z_{6n}$ of the $n^{th}$ filter (n=2, 3, 4, ..., n).

Figure 7:
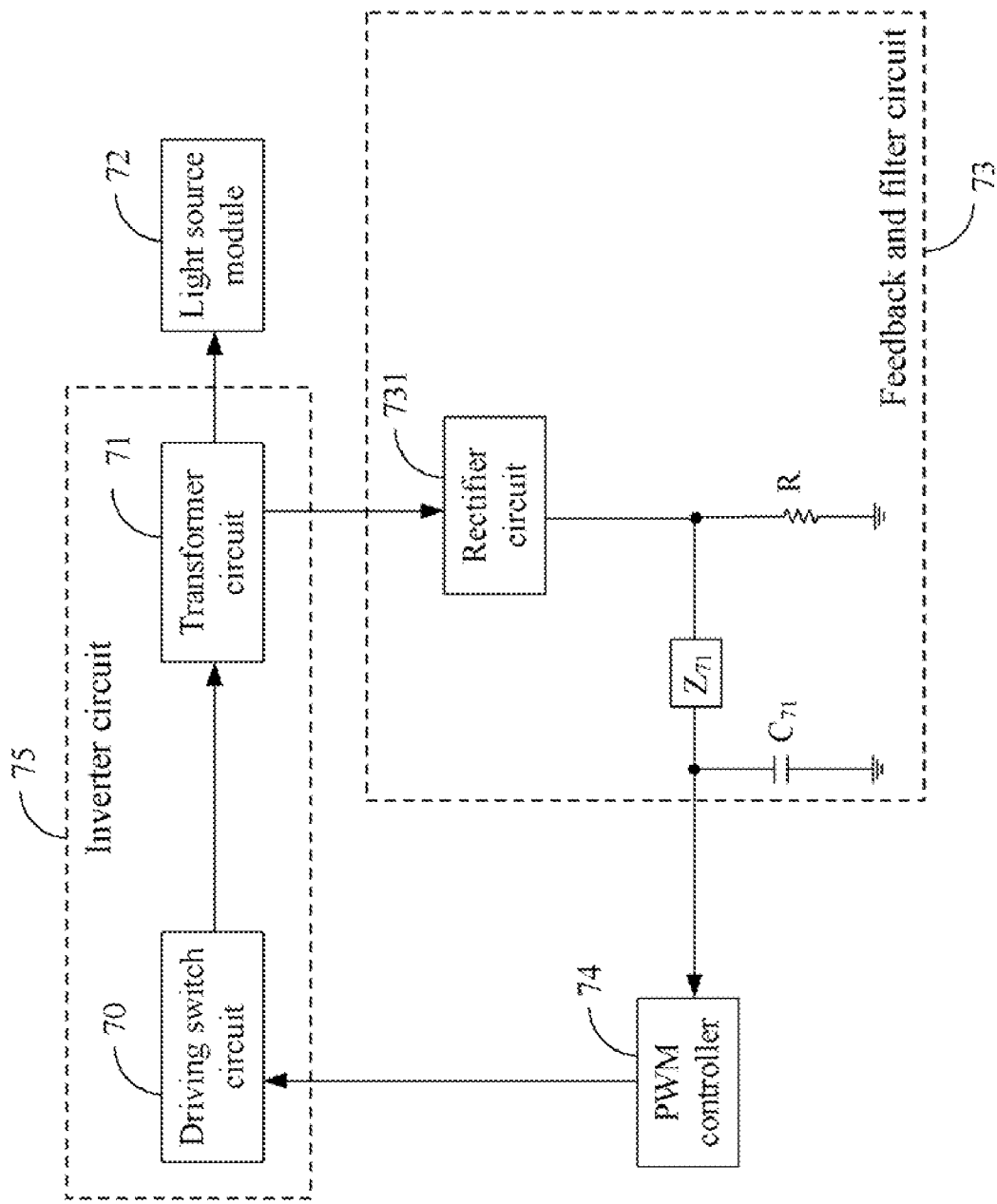
FIG. 7 is a block diagram of a light source driving device of a ninth exemplary embodiment of the present invention.

FIG. 7 is a block diagram of a light source driving device of a ninth exemplary embodiment of the present invention. The light source driving device of FIG. 7 includes an inverter circuit 75 including a driving switch circuit 70 and a transformer circuit 71, a light source module 72, a feedback and filter circuit 73, and a PWM controller 74. The feedback and filter circuit 73 includes a rectifier circuit 731, a resistor R, and a filter including an impedance $Z_{71}$ and a capacitor $C_{71}$. All elements, constructions, and functions of the light source driving device of FIG. 7 are the same as the light source driving device of FIG. 5a, except that the feedback and filter circuit 73 is electrically connected between the transformer circuit 71 and the PWM controller 74, and the rectifier circuit 731 is electrically connected between an input of the filter and a low voltage terminal of the transformer circuit 71.

Figure 8:
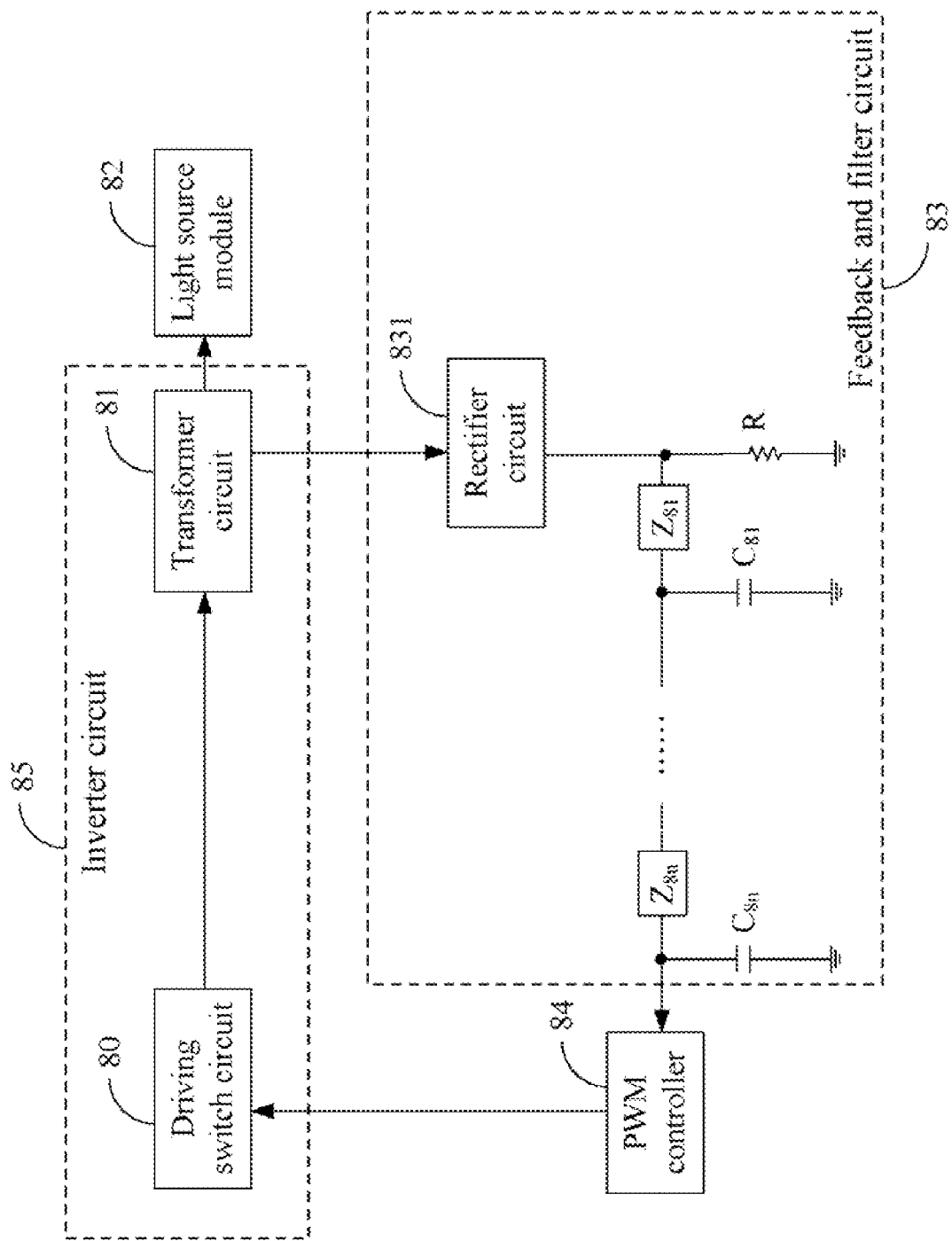
FIG. 8 is a block diagram of a light source driving device of a tenth exemplary embodiment of the present invention.

FIG. 8 is a block diagram of a light source driving device of a tenth exemplary embodiment of the present invention. The light source driving device of FIG. 8 includes an inverter circuit 85 including a driving switch circuit 80 and a transformer circuit 81, a light source module 82, a feedback and filter circuit 83, and a PWM controller 84. The feedback and filter circuit 83 includes a rectifier circuit 831, a resistor R, and a plurality of filters, herein the number of the filters is n, where n is an integer from 2 to n. Each of the filters includes an impedance $Z_{8n}$ and a capacitor $C_{8n}$ (n=1, 2, 3, 4, ..., n). All elements, constructions, and functions of the light source driving device of FIG. 8 are the same as the light source driving device of FIG. 6, except that the feedback and filter circuit 83 is electrically connected between the transformer circuit 81 and the PWM controller 84, and the rectifier circuit 831 is electrically connected between an input of the first filter and a low voltage terminal of the transformer circuit 81.

While embodiments of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A driving device for driving a light source module comprising a plurality of light sources, the driving device comprising:
    an inverter circuit for converting a received signal to a signal driving the light sources;
    a feedback and filter circuit for feeding back current flowing through the light sources and filtering radio frequency interference (RFI) signals of feedback current, the feedback and filter circuit comprising at least one filter for filtering the RFI signals of the feedback current, and a resistor for feeding back the current flowing through the light sources, the at least one filter comprising an impedance comprising a first terminal designated as an input of the at least one filter and a second terminal, and a capacitor comprising a third terminal designated as an output of the at least one filter and a fourth terminal electrically connected to ground; and
    a controller electrically connected between the feedback and filter circuit and the inverter circuit;
    wherein the feedback and filter circuit further comprises a rectifier circuit electrically connected between the second terminal of the impedance and the capacitor, the rectifier circuit for converting an AC signal flowing through the light sources to a ripple signal.

2. The driving device as claimed in claim 1, wherein the feedback and filter circuit is electrically connected between the light source module and the controller.

3. The driving device as claimed in claim 1, wherein the inverter circuit comprises a driving switch circuit for converting the received signal to an AC signal, and a transformer circuit electrically connected to the driving switch circuit, the transformer circuit for converting the AC signal to the signal for driving the light source module.

4. The driving device as claimed in claim 1, wherein the resistor is connected between the third terminal of the capacitor and ground.

5. The driving device as claimed in claim 1, wherein the resistor is connected between the second terminal of the impedance and ground.

6. An assembly comprising:

a light source module comprising a plurality of light sources;

an inverter circuit for converting a received signal to a signal driving the light sources;

a feedback and filter circuit for feeding back current flowing through the light sources and filtering radio frequency interference (RFI) signals of feedback current, the feedback and filter circuit comprising at least one filter for filtering the RFI signals of the feedback current, and a resistor for feeding back the current flowing through the light sources, the at least one filter comprising an impedance comprising a first terminal designated as an input of the filter and a second terminal, and a capacitor comprising a third terminal designated as an output of the filter and a fourth terminal electrically connected to ground; and a controller electrically connected between the feedback and filter circuit and the inverter circuit, the controller for controlling output of the inverter circuit in light of the feedback current signals;

wherein the feedback and filter circuit further comprises a rectifier circuit electrically connected between the second terminal of the impedance and the capacitor, the rectifier circuit for converting an AC signal flowing through the light sources to a ripple signal.

7. The assembly as claimed in claim 6, wherein the at least one filter comprises a plurality of filters, herein the number of the filters is defined as n, where n is an integer from 2 to n; the output of the $(n-1)^{th}$ filter is electrically connected to the input of the nth filter.

8. The assembly as claimed in claim 6, wherein the feedback and filter circuit is electrically connected between the light source module and the controller.

9. The assembly as claimed in claim 6, wherein the inverter circuit comprises a driving switch circuit for converting the received signal to an AC signal, and a transformer circuit electrically connected to the driving switch circuit, the transformer circuit for converting the AC signal to the signal for driving the light source module.

* * * * *

UNITED STATES PATENT AND TRADEMARK OFFICE
CERTIFICATE OF CORRECTION

PATENT NO. : 7,667,412 B2 Page 1 of 1
APPLICATION NO. : 11/617758
DATED : February 23, 2010
INVENTOR(S) : Hung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 17 days.

Signed and Sealed this

Seventh Day of December, 2010

David J. Kappos
*Director of the United States Patent and Trademark Office*